United States Patent [19]
Wong

[11] Patent Number: 5,051,275
[45] Date of Patent: Sep. 24, 1991

[54] SILICONE RESIN ELECTRONIC DEVICE ENCAPSULANT

[75] Inventor: Ching P. Wong, Lawrenceville, N.J.

[73] Assignee: AT&T Bell Laboratories, Murray Hill, N.J.

[21] Appl. No.: 434,052

[22] Filed: Nov. 9, 1989

[51] Int. Cl.[5] .............................................. B32B 31/26
[52] U.S. Cl. ........................................ 427/58; 427/82; 427/96; 428/68; 428/76; 428/447; 357/72
[58] Field of Search .......................... 428/76, 447, 68; 357/72; 427/96, 387, 58, 82

[56] References Cited

U.S. PATENT DOCUMENTS

| | | | |
|---|---|---|---|
| 4,564,562 | 1/1986 | Wong | 428/447 |
| 4,592,959 | 6/1986 | Wong | 428/450 |
| 4,888,226 | 12/1989 | Wong | 428/76 |

OTHER PUBLICATIONS

"An Overview of Integrated Circuit Device Encapsulants", by C. P. Wong, *Journal of Electronic Packaging*, vol. 111, Jun. 1989, pp. 97–107.

"High-Performance Silicone Gel as Integrated-Circuit-Device Chip Protection", by C. P. Wong in ACS Symposium Series 407, Polymeric Materials for Electronics Packaging and Interconnection, edited by J. H. Lupinski and R. S. Moore, (American Chemical Society, 12/1989), pp. 220–229.

*Primary Examiner*—Alexander S. Thomas
*Attorney, Agent, or Firm*—R. B. Anderson

[57] ABSTRACT

An electronic device is encapsulated by a curable material which, prior to cure, consists essentially of (a) 33 to 39 percent of a silicone resin selected from the group consisting of (i) polydimethylsiloxane, containing a platinum catalyst and having functional components selected from the group consisting of vinyl and hydride functional components, (ii) polymethylphenylsiloxane containing a platinum catalyst and having functional components selected from the group consisting of vinyl and hydride functional components, and (iii) a mixture of (i) and (ii), (b) 51 to 57 weight percent of silicon dioxide and (c) 8 to 12 weight percent of a low vapor pressure organic solvent, preferably an alcohol ester.

7 Claims, 2 Drawing Sheets

SILICONE RESIN ELECTRONIC DEVICE ENCAPSULANT

TECHNICAL FIELD

This invention relates to electronic devices which are encapsulated by a polymeric encapsulant, and, more particularly, to such devices which are encapsulated by a silicone resin.

BACKGROUND OF THE INVENTION

Silicone resins have been used for a number of purposes because of their relative thermal stability, dielectric properties, chemical stability and resistance to atmospheric deterioration. The U.S. Pat. No. 4,564,562 of C. P. Wong is an example of the prior art showing the use of silicone resin elastomers as encapsulants for electronic devices, particularly hybrid integrated circuits. A hybrid integrated circuit is one in which a semiconductor chip, usually a silicon chip, is connected to a bonding pad region of a circuit pattern on a ceramic substrate. The encapsulant of the Wong patent is sufficiently fluid to be screen printable and it adheres well to gold and tantalum nitride surfaces, which are sometimes the metals used as the circuit pattern. One problem with that particular resin is its tendency to crack at high temperatures; the uncured molecule contains OH terminations which create a water by-product during cure which in turn makes it susceptible to cracking. Another problem is the relatively long curing time at an elevated temperature that is required.

The U.S. application of C. P. Wong, Ser. No. 229,403, filed Aug. 8, 1988 U.S. Pat. No. 4,888,226, describes the use of a silicone resin gel as an encapsulant, particularly for wire-bonded integrated circuits. The disclosed resin comprises polydimethylsiloxane and/or polymethylphenylsiloxane having vinyl and hydride functional components, and tests described in the patent application show that it is particularly resistant to high-temperature cycling. A more detailed discussion of silicone gel encapsulants is included in the paper "High-Performance Silicone Gel as Integrated-Circuit-Device Chip Protection," by C. P. Wong, included in the book "Polymeric Materials for Electronics Packaging and Interconnection," J. H. Lupinski and Robert S. Moore, editors, *American Chemical Society*, Washington, D.C., 1989. A discussion of how silicone resin encapsulants compare with other encapsulants such as epoxies, polyimides and polyurethanes is contained in the paper "An Overview of Integrated Circuit Device Encapsulants," by C. P. Wong, *Journal of Electronic Packaging*, June, 1989, Vol. 111, pages 97-107. One problem with the material described in the Wong patent application is that it is not screen printable; that is, in its uncured state it is too thick to be deposited on a hybrid integrated circuit by conventional screen printing methods.

There is therefore a continuing need in the industry for a hybrid integrated circuit encapsulant that is screen-printable, has a reasonably short cure time, is not susceptible to high temperature cracking, but which obtains the benefits of known silicone encapsulants such as good adhesion to ceramics and metals, resistance to atmospheric contaminants, good structural characteristics and good temperature-humidity-electrical bias (THB) characteristics.

SUMMARY OF THE INVENTION

In accordance with the invention, an electronic device is encapsulated by a curable material which, prior to cure, comprises (a) 33 to 39 percent of a silicone resin selected from the group consisting of (i) polydimethylsiloxane, containing a platinum catalyst and having functional components selected from the group consisting of vinyl and hydride functional components, (ii) polymethylphenylsiloxane containing a platinum catalyst and having functional components selected from the group consisting of vinyl and hydride functional components, and (iii) a mixture of (i) and (ii), (b) 51 to 57 weight percent of silicon dioxide and (c) 8 to 12 weight percent of a low vapor pressure organic solvent, preferably an alcohol ester. The curable material is preferably a mixture of polydimethylsiloxane and polymethylphenylsiloxane, 50 percent having vinyl functional components, and 50 percent having hydride functional components. The mixture in accordance with the invention has an appropriate viscosity for application by screen printing, adheres well to metal, ceramic, and other components of a hybrid integrated circuit, and is durable and has good THB characteristics.

Other objects and advantages of the invention will be better understood from a consideration of the following detailed description, taken in conjunction with the accompanying drawings.

DETAILED DESCRIPTION

Figure 1:
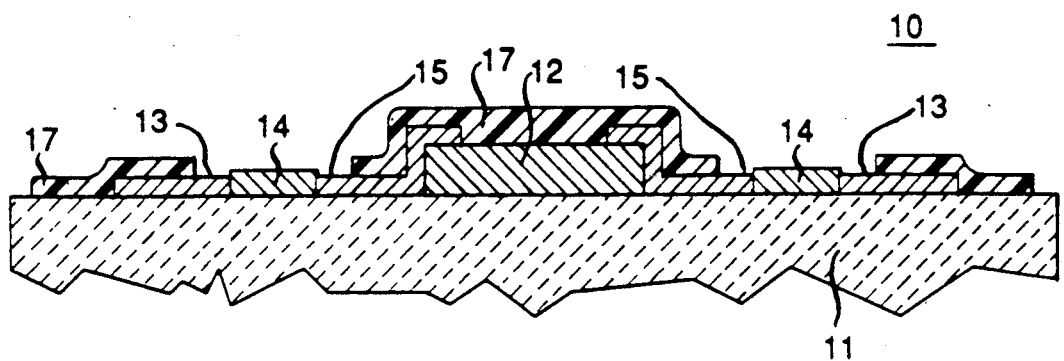
FIG. 1 is a schematic sectional view of part of a hybrid integrated circuit in accordance with one embodiment of the invention.
Figure 2:
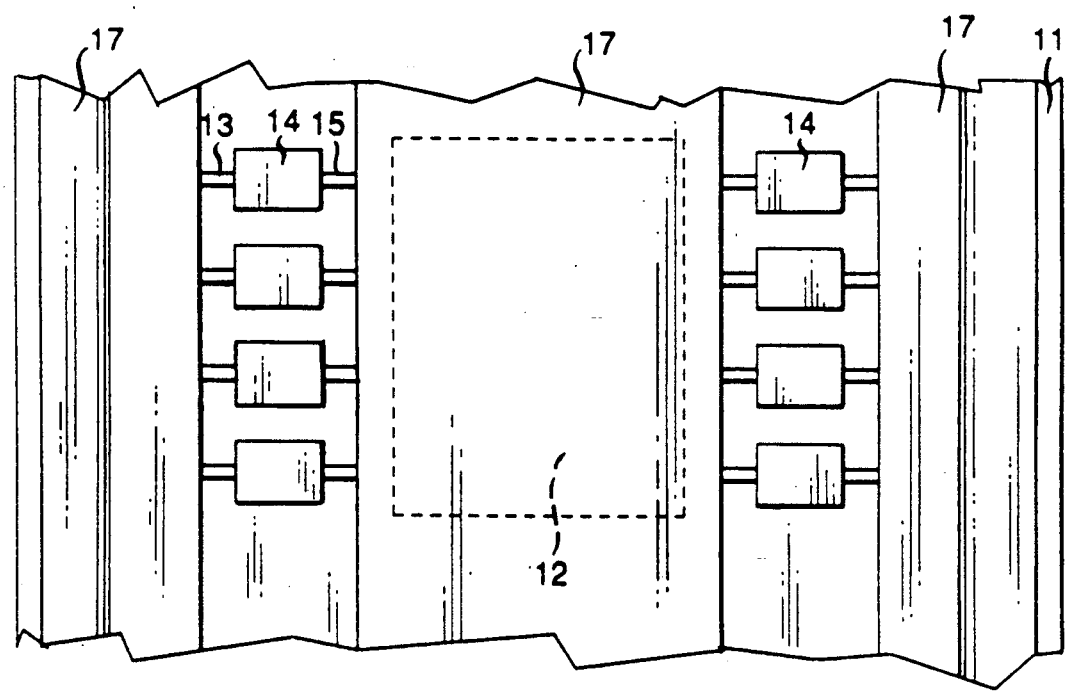
FIG. 2 is a top view of the hybrid integrated circuit of FIG. 1.

Referring now to FIGS. 1 and 2, there is shown schematically a hybrid integrated circuit 10 comprising a ceramic substrate 11 upon which is mounted a silicon chip 12. Defined on the upper surface of the substrate is a conductor pattern comprising metal conductors 13 connected to bonding pads 14. The bonding pads are connected to the chip 12 by conductors 15. Overlying a major part of conductors 13 and semiconductor chip 12 is a silicone resin encapsulant 17. It is intended that the encapsulant cover the chip 12 and a major part of the conductor pattern on the surface of the ceramic substrate while leaving exposed bonding pads 14 so that conductive bonds can be made to them for hard-wiring the hybrid integrated circuit to an external electronic system.

In accordance with the invention, the encapsulant 17 is applied by the known process of screen printing and, prior to cure, it comprises 33 to 39 percent by weight of a silicone resin which may be polydimethylsiloxane or polymethylphenylsiloxane, each of which contains a platinum catalyst and vinyl or hydride functional components, 50 to 57 percent by weight of silicon dioxide and 8 to 12 percent by weight of a low vapor pressure organic solvent. The silicon dioxide, which acts as a filler, is preferably powdered fused silica with a small amount of fumed silica. The silicon dioxide improves the encapsulant solvent resistance and its adhesion properties, particularly to the conductors 13 and 15, which may be copper, gold, titanium or other metals. The uncured resin composition is sufficiently fluid to be screen printable through the use of a 200 mesh screen utilizing stainless steel over an emulsion, as is known in the art. After application, the composition is cured by heating for one to two hours at about 175° Centigrade. As is known, a cure temperature as low as 120° C. can be used if one is willing to tolerate a longer cure time and a cure temperature as high as 200° C. may also be used, in which case cure time may be shortened somewhat. After cure, the encapsulant has a Shore D hardness, as prescribed by the ASTM method, of about 30±2, and, as such, is capable of thereafter withstanding the rigors of rough handling.

Table I shows six different compositions that were made in accordance with the invention, tested, and found to have satisfactory characteristics. All were cured at 175° C. for two hours. The silicone resin was in all cases DC 3-4939, a polydimethylsiloxane and polymethylphenylsiloxane silicone resin commercially available from the Dow Chemical Company of Midland, Mi., which contains a small amount of platinum catalyst in addition to the silicone. More specifically, the DC 3-4939 is designated "A" or "B", the A designating a resin terminated with a vinyl functional group and the B designating a resin terminated with a hydride functional group. In both cases, the resin is about 80 percent polydimethylsiloxane and 20 percent polymethylphenylsiloxane. The silica was a mixture of silica commercially available as "A10" and "V10" silica, which have grains about a few microns in diameter. In all cases, the silicone resin portion consisted of 50 percent "A" resin and 50 percent "B" resin; thus, 50 percent of the resin was terminated with a vinyl functional group and 50 percent with a hydride functional group, although any of various mixtures of "A" and "B" resin could be used.

invention, compares extremely favorably with competing electronic device encapsulants.

To give the uncured resin sufficient viscosity to be screen printable, there is included in the mixture eight to twelve weight percent of a low vapor pressure organic solvent, preferably an alcohol ester. The vapor pressure must be sufficiently low to prevent evaporation of the solvent during screen printing, thereby to maintain the desired viscosity. Preferably, the vapor pressure of the solvent should be less than about twenty Torr at room temperature. In all of the examples given above, the low vapor pressure solvent was an alcohol ester known as Texanol 9450, commercially available from the Du Pont Company of Wilmington, Del. Texanol 9450 has a sufficiently low vapor pressure to maintain its stability during screen printing, but it evaporates completely during a cure time of between one and three hours. Although a longer cure time could be used, it is anticipated that in all embodiments of the invention, cure time will be between one and three hours, which is significantly shorter, for example, than the cure time of the resins described in the aforementioned Wong patent.

Figure 4:
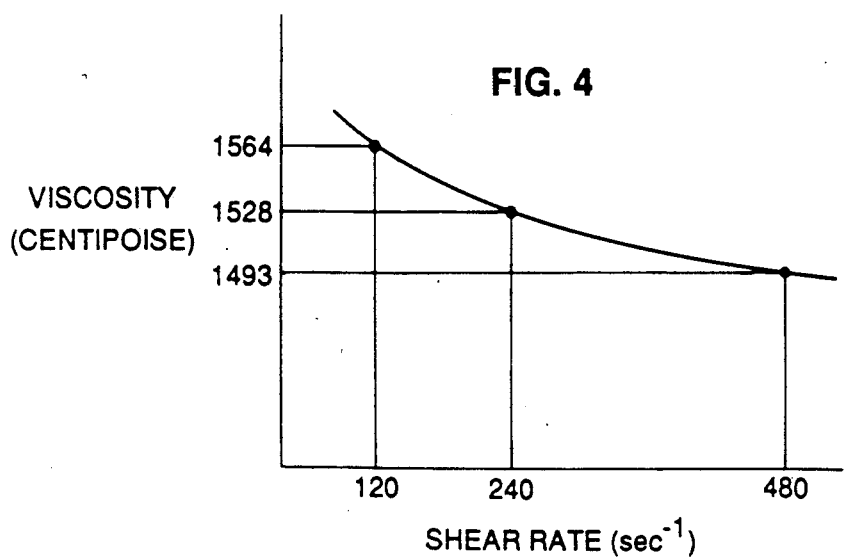
FIG. 4 is a graph of viscosity versus shear rate of the encapsulant used in FIGS. 1 and 2.

FIG. 4 is a graph of viscosity versus shear rate of Example 3 of Table I. As is known, shear rate is a function of the rate with which the resin is pressed through the screen during a screen printing operation. Over a fairly wide range of shear rates, the viscosity had a value of between 1493 and 1564 centipoise, which indicates a viscosity that is appropriate for screen printing. The other examples were likewise suitable for screen printing.

The various embodiments that have been described are intended to be merely descriptive of particular embodiments of the invention. Various other modifications and embodiments may be made by those skilled in the art without departing from the spirit and scope of the invention.

I claim:

TABLE I

|  | Example 1 | | Example 2 | | Example 3 | | Example 4 | | Example 5 | | Example 6 | |
| --- | --- | --- | --- | --- | --- | --- | --- | --- | --- | --- | --- | --- |
|  | grams | wt % | grams | wt % | grams | wt % | grams | wt % | grams | wt % | grams | wt % |
| Silicone Resin | 100 | 33 | 100 | 33 | 100 | 35 | 100 | 35 | 100 | 39 | 100 | 39 |
| Fused Silica | 167 | 55 | 173 | 57 | 163 | 57 | 151 | 53 | 136 | 53 | 131 | 51 |
| Fumed Silica | 0.2 |  | 0.2 |  | 0.2 |  | 0.2 |  | 02. |  | 0.2 |  |
| Solvent | 36 | 12 | 30 | 10 | 23 | 8 | 34 | 12 | 21 | 8 | 26 | 10 |

Figure 3:
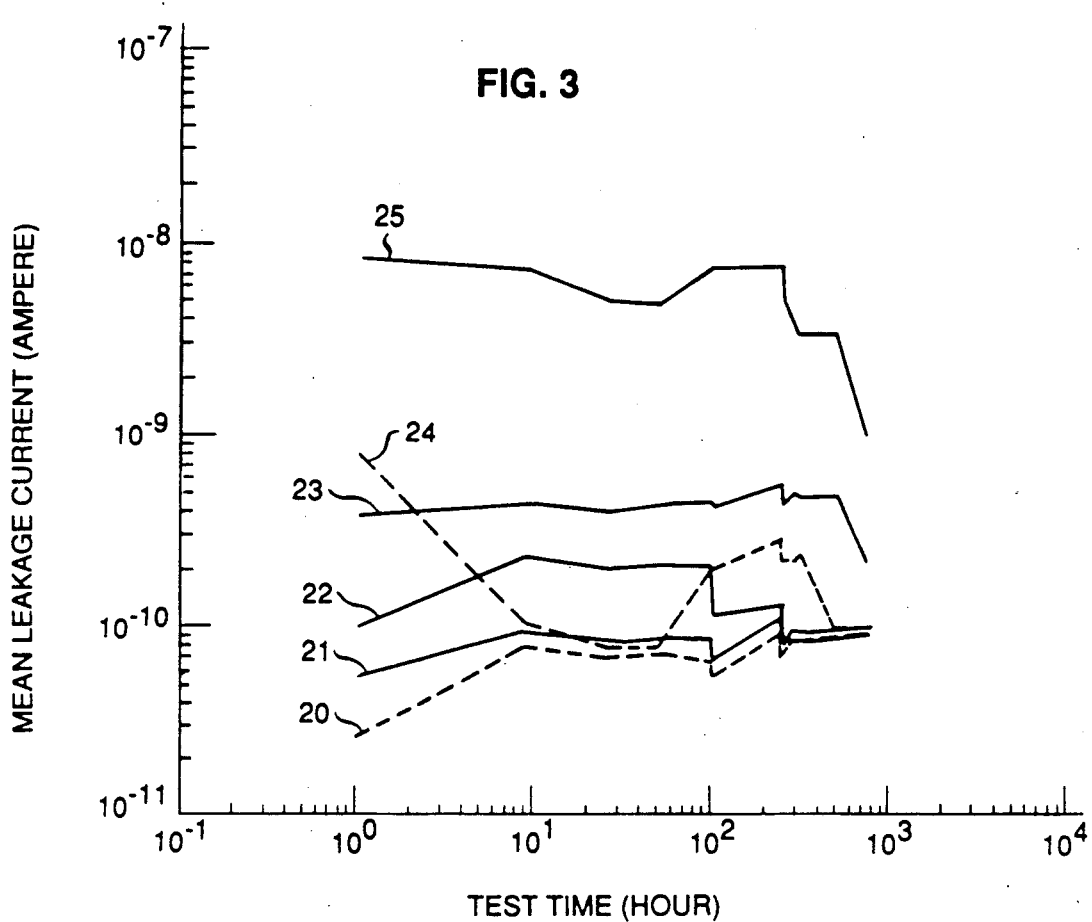
FIG. 3 is a graph comparing the electrical leakage of an encapsulant made in accordance with the invention with that of other encapsulants.

FIG. 3 shows the temperature-humidity-bias (THB) test results of the encapsulant of Example 4 of Table I, along with the results for other commonly used hybrid integrated circuit encapsulants. Specifically, curve 20 illustrates the test results for the silicone encapsulant of Example 4, curve 21 is for a silicone polyimide encapsulant known as 2010M, available from Occidental Chemicals, Buffalo, N.Y., curve 22 is for an encapsulant of benzocyclobutene, known as BCB, and available from Dow Chemicals of Midland, Mi., curve 23 is for a silicone polyimide copolymer known as M&T 1236, available from M&T Chemicals of Rahway, N.J., curve 24 is for parylene-C, available from Novatron, a subsidiary of Union Carbide, Clearlake, Wi., and curve 25 is for a polyimide encapsulant known as PIQ-8140, available from Hitachi of Tokyo, Japan. The curves all measure the mean leakage current as a function of test time in an atmosphere of 85 percent relative humidity, 85° C., with ten volts DC bias across the encapsulant. As can be seen, the curve 20, representing the encapsulant of the 1. A method for encapsulating at least part of an electronic device comprising the steps of making a mixture comprising 33 to 39 weight percent of a silicone resin, 51 to 57 weight percent of silicon dioxide and 8 to 12 weight percent of a high boiling point organic solvent;

the silicone resin being selected from the group consisting of (i) polydimethylsiloxane containing a platinum catalyst and having functional components selected from the group consisting of vinyl and hydride functional components, (ii) polymethylphenylsiloxane containing a platinum catalyst and functional components selected from the group consisting of vinyl and hydride functional components and (iii) a mixture of polydimethylsiloxane and polymethylphenylsiloxane, each of which contains a platinum catalyst and functional components selected from the group consisting of vinyl and hydride functional components;

depositing the mixture over an electronic device;

and curing the mixture by heating it at an elevated temperature for a sufficient time to harden the mixture.

2. The method of claim 1 wherein the mixture is cured at a cure temperature of between 120 and 200 degrees Centigrade for one to three hours;

and the organic solvent has a sufficiently low vapor pressure to prevent it from evaporating during deposition.

3. The method of claim 2 wherein the solvent comprises an alcohol ester.

4. The method of claim 1 wherein the mixture is deposited on the electronic device by screen printing.

5. The method of claim 1 wherein the silicone resin comprises approximately 50 weight percent of a first silicone resin having vinyl functional components and approximately 50 weight percent of a second silicone resin having hydride functional components.

6. The method of claim 1 wherein the silicone resin comprises approximately 50 percent of a mixture of polydimethylsiloxane and polymethylphenylsiloxane each having vinyl functional components and 50 percent of a mixture of polydimethylsiloxane and polymethylphenylsiloxane each having hydride functional components.

7. The method of claim 7 wherein:
the electronic device is an integrated circuit.

* * * * *